United States Patent
Keating et al.

(10) Patent No.: US 11,076,319 B2
(45) Date of Patent: Jul. 27, 2021

(54) METHOD FOR CONTENTION BASED PRECONFIGURED UPLINK RESOURCES IN NEW RADIO IOT

(71) Applicant: Nokia Technologies Oy, Espoo (FI)

(72) Inventors: Ryan Keating, Chicago, IL (US); Nitin Mangalvedhe, Hoffman Estates, IL (US); Rapeepat Ratasuk, Hoffman Estates, IL (US); Srinivasan Selvaganapathy, Bangalore (IN)

(73) Assignee: Nokia Technolgies Oy, Espoo (FI)

( * ) Notice: Subject to any disclaimer, the term of this patent is extended or adjusted under 35 U.S.C. 154(b) by 0 days.

(21) Appl. No.: 16/583,701

(22) Filed: Sep. 26, 2019

(65) Prior Publication Data

US 2021/0099917 A1    Apr. 1, 2021

(51) Int. Cl.
| | |
|---|---|
| *H04W 4/00* | (2018.01) |
| *H04W 28/26* | (2009.01) |
| *H04W 76/11* | (2018.01) |
| *H04W 74/08* | (2009.01) |
| *H04W 72/04* | (2009.01) |
| *H04W 24/08* | (2009.01) |

(52) U.S. Cl.
CPC .......... *H04W 28/26* (2013.01); *H04W 24/08* (2013.01); *H04W 72/042* (2013.01); *H04W 74/0833* (2013.01); *H04W 76/11* (2018.02)

(58) Field of Classification Search
None
See application file for complete search history.

(56) References Cited

U.S. PATENT DOCUMENTS

| | | | |
|---|---|---|---|
| 2017/0164272 A1* | 6/2017 | Morioka | H04W 72/0406 |
| 2018/0070335 A1* | 3/2018 | Amuru | H04L 5/0091 |
| 2020/0059390 A1* | 2/2020 | Zhang | H04L 1/0004 |
| 2020/0260470 A1* | 8/2020 | Awad | H04L 1/1812 |

FOREIGN PATENT DOCUMENTS

WO    WO-2020093392 A1 *  5/2020   ........ H04W 72/1268

OTHER PUBLICATIONS

Nokia et al.; "Transmission in preconfigured UL resources"; R1-1906702; 3GPP TSG-RAN WG1 Meeting #97, Reno, USA; May 13-17, 2019; whole document (11 pages).
Ericcson; "New WID on Rel-16 MTC enhancements for LTE"; RP-181450; 3GPP TSG RAN Meeting #80, La Jolla, USA; Jun. 11-14, 2018; whole document (4 pages).
Ericcson et al.; "New WID on Rel-16 MTC enhancements for NB-IoT"; RP-181451; 3GPP TSG RAN Meeting #80, La Jolla, USA; Jun. 11-14, 2018; whole document (4 pages).

\* cited by examiner

*Primary Examiner* — Phuongchau Ba Nguyen
(74) *Attorney, Agent, or Firm* — Harrington & Smith

(57) ABSTRACT

In accordance with example embodiments of the invention there is at least a method and apparatus to perform determining, by a network node of a communication network, for assignment to at least one network device more than one resource configuration comprising a resource configuration for a contention based resource and a further resource configuration for a dedicated resource, wherein the further resource configuration is reserved as a fall back for a case where a data communication using the contention based resource is not successfully decoded by the network node; and communicating between the network node and the at least one network device information comprising the more than one resource configuration for use to communicate the data communication.

11 Claims, 5 Drawing Sheets

METHOD FOR CONTENTION BASED PRECONFIGURED UPLINK RESOURCES IN NEW RADIO IOT

TECHNICAL FIELD

The teachings in accordance with the exemplary embodiments of this invention relate generally to enabling contention based preconfigured uplink resources (PURs) and, more specifically, relate to enabling contention based preconfigured uplink resources for devices such as including NR-Light devices.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
ACK Acknowledgement
BWP Bandwidth Part
CBS Contention Based Shared
CFS Contention Free Shared
DCI Downlink Control Information
D-PUR Dedicated PUR
gNB 5G Base Station
IoT Internet of Things
LTE Long Term Evolution
MTC Machine Type Communications
NACK Non-Acknowledgement
NB-IoT Narrowband IoT
NR New Radio (5G)
PRACH Physical Random Access Channel
PUR Preconfigured Uplink Resource
PUSCH Physical Uplink Shared Channel
RNTI Radio Network Temporary Identifier
TDD Time Division Duplex
UE User Equipment
URLLC Ultra Reliable Low Latency Communication Various communication systems may benefit from improved uplink data transmission. The Applicants have proposed that certain communication systems may benefit from:

Higher data rate & reliability and lower latency than eMTC & NB-IoT;

Lower cost/complexity and longer battery life than NR eMBB; and

Wider coverage than eMBB

Example embodiments of the invention work to provide at least these features.

SUMMARY

This section contains examples of possible implementations and is not meant to be limiting.

In an example aspect of the invention, there is a method, comprising: determining, by a network node of a communication network, for assignment to at least one network device more than one resource configuration comprising a resource configuration for a contention based resource and a further resource configuration for a dedicated resource, wherein the further resource configuration is reserved as a fall back for a case where a data communication using the contention based resource is not successfully decoded by the network node; and sending towards the at least one network device information comprising the more than one resource configuration.

In another example aspect of the invention there is an apparatus comprising: at least one processor; and at least one memory including computer program code, where the at least one memory and the computer program code are configured, with the at least one processor, to cause the apparatus to at least: determine, by a network node of a communication network, for assignment to at least one network device more than one resource configuration comprising a resource configuration for a contention based resource and a further resource configuration for a dedicated resource, wherein the further resource configuration is reserved as a fall back for a case where a data communication using the contention based resource is not successfully decoded by the network node; and send towards the at least one network device information comprising the more than one resource configuration.

In another example aspect of the invention there is an apparatus comprising: means for determining, by a network node of a communication network, for assignment to at least one network device more than one resource configuration comprising a resource configuration for a contention based resource and a further resource configuration for a dedicated resource, wherein the further resource configuration is reserved as a fall back for a case where a data communication using the contention based resource is not successfully decoded by the network node; and means for sending towards the at least one network device information comprising the more than one resource configuration.

In still another example aspect of the invention, there is a method comprising: receiving from a network node, by at least one network device of a communication network, more than one resource configuration assigned to the at least one network device, comprising a resource configuration for a contention based resource and a further resource configuration for a dedicated resource that is reserved as a fall back for a case where a data communication using the contention based resource is not successfully decoded by the network node; and based on the receiving, sending, by the at least one network device, a data communication using the contention based resource of the more than one resource configuration assigned by the communication network to the at least one network device.

In another example aspect of the invention there is an apparatus comprising: at least one processor; and at least one memory including computer program code, where the at least one memory and the computer program code are configured, with the at least one processor, to cause the apparatus to at least: receive from a network node, by at least one network device of a communication network, more than one resource configuration assigned to the at least one network device, comprising a resource configuration for a contention based resource and a further resource configuration for a dedicated resource that is reserved as a fall back for a case where a data communication using the contention based resource is not successfully decoded by the network node; and based on the receiving, send, by the at least one network device, a data communication using the contention based resource of the more than one resource configuration assigned by the communication network to the at least one network device.

In yet another example aspect of the invention there is an apparatus comprising: means for receiving from a network node, by at least one network device of a communication network, more than one resource configuration assigned to the at least one network device, comprising a resource configuration for a contention based resource and a further resource configuration for a dedicated resource that is reserved as a fall back for a case where a data communication using the contention based resource is not successfully decoded by the network node; and means, based on the receiving, for sending, by the at least one network device, a data communication using the contention based resource of the more than one resource configuration assigned by the communication network to the at least one network device.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which.

DETAILED DESCRIPTION

In example embodiments of this invention there is proposed at least a method and apparatus for enabling contention based preconfigured uplink resources for devices such as including NR-Light devices.

As similarly stated above, in Rel-17, there is proposed to introduce NR-Light (also referred to as NR-based IoT or NR-Lite) to address use cases that cannot be met by NR eMBB, URLLC or eMTC/NB-IoT. NR-Light will support the following requirements:

Higher data rate & reliability and lower latency than eMTC & NB-IoT;

Lower cost/complexity and longer battery life than NR eMBB; and

Wider coverage than eMBB

Specifically, NR-Light will address the following objectives and use cases:

Moderate data rates up to [100] Mbps to support e.g. live video feed, visual production control, process automation;

Moderate latency of around [10-30] ms to support e.g. remote drone operation, cooperative farm machinery, time-critical sensing and feedback, remote vehicle operation;

Low complexity device with module cost comparable to LTE;

Coverage enhancement of [10-15] dB compared to eMBB;

Low power consumption with battery life [2-4×] longer than eMBB; and

[FFS] Positioning accuracy of [30 cm-1 m] to support e.g. indoor asset tracking, coordinated vehicle control, remote monitoring One key feature is proposed to introduce for NR-Light is Preconfigured Uplink Resource (PUR), which is also known as grant-free uplink transmission. The UE will be configured with idle-mode or inactive-mode PUR while in RRC connected mode.

A key feature planned is to introduce for NR-Light is Preconfigured Uplink Resource (PUR), which is also known as grant-free uplink transmission. The UE will be configured with idle-mode or inactive-mode PUR while in RRC connected mode.

In addition, eMTC and NB-IoT may also continue to see further improvements in Rel-17.

Such improvements can be as part of the Rel-16 enhancements of eMTC and NB-IoT (work items RP-181450 and RP-181451). In addition, one of the objectives of both WIs is to specify support for transmission in preconfigured uplink resources in idle and/or connected mode based on SC-FDMA waveform for UEs with a valid timing advance [RAN1, RAN2, RAN4].

In LTE, a dedicated preconfigured uplink resource (PUR) in idle mode is supported. Dedicated means that unique or dedicated time-frequency resource are reserved for each UE configured with PUR. This also means that PUR transmission is contention-free when one UE is allocated the time/frequency resources.

In Rel-17, there is proposed to introduce NR-Light (also referred to as NR-based IoT or NR-Lite) to address use cases that cannot be met by NR eMBB, URLLC or eMTC/NB-IoT. One key goals of NR-Light is to support Industrial IoT deployment using low-cost, low-complexity devices with long battery life. To provide support for low-cost it is likely that preconfigured uplink resources (PUR) will again be introduced. Dedicated PUR works well for cases where the data traffic is periodic but is not well suited for busty or aperiodic traffic.

Sharing of PURs could be one solution to allow multiple IoT devices which have bursty traffic to make reports while remaining in an idle or inactive state. However, if PURs are no longer dedicated to a single UE there needs to be a contention resolution process. In particular if a UE tries to use any contention based PUR resources but is unsuccessful then a fallback method needs to be defined.

Further, it is noted that support for contention free shared preconfigured uplink resources (CFS PUR) has been discussed in 3GPP. The concept of contention-based resources is also well known for example in the non-orthogonal multiple access (NOMA) area. However, at the time of this application there appears to not be any direct prior art on contention based shared PUR for NR or on mechanisms for contention resolution in PUR.

Example embodiments of this invention propose at least a scheme to enable contention based shared preconfigured uplink resource (CBS PUR) for NR-Light devices and fallback mechanisms needed for contention resolution.

Figure 4:
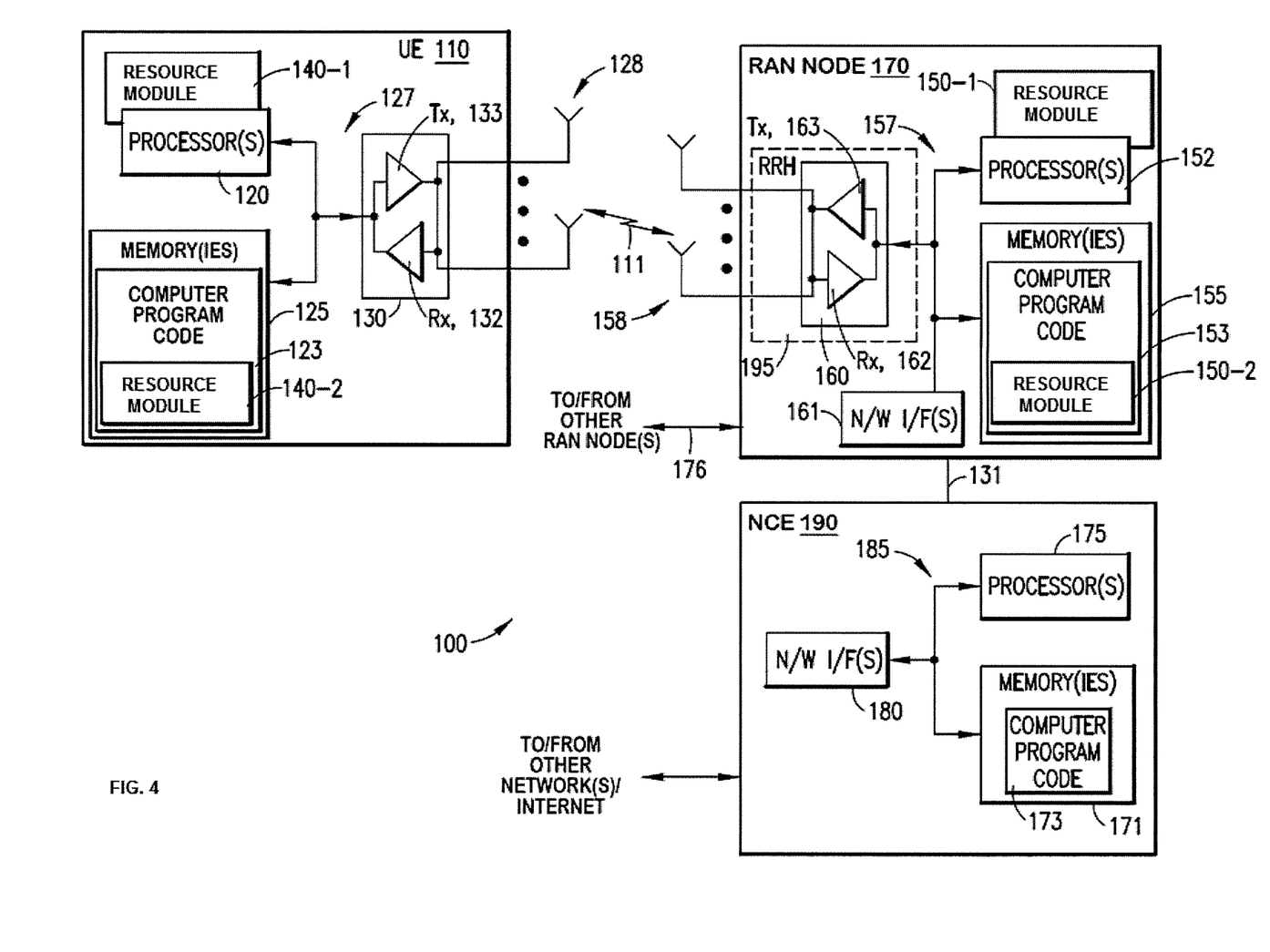
FIG. 4 illustrates a simplified block diagram of example electronic devices that are suitable for use in practicing various example embodiments of this invention.

However, before describing example embodiments of the invention in further detail, reference is made to FIG. 4 which illustrates a simplified block diagram of example electronic devices that are suitable for use in practicing various example embodiments of this invention.

Turning to FIG. 4, this figure shows a block diagram of one possible and non-limiting example system in which the example embodiments of the invention may be practiced. In FIG. 4, a user equipment (UE) 110 is in wireless communication with a wireless network 100. A UE is a wireless, typically mobile device that can access a wireless network. The UE, for example, may be a mobile phone (or called a "cellular" phone) and/or a computer with a mobile terminal function. For example, the UE or mobile terminal may also be a portable, pocket, handheld, computer-embedded or vehicle-mounted mobile device and performs a language signaling and/or data exchange with the RAN.

The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module, comprising one of or both parts 140-1 and/or 140-2, which may be implemented in a number of ways. The UE 110 includes processing components including a resource module(s) 140-1 and 140-2. These resource modules can include processor configurations that can be implemented to perform example embodiments of the invention as disclosed herein. The resource module may be implemented in hardware as resource module 140-1, such as being implemented as part of the one or more processors 120. The resource module 140-1 may be implemented also as an integrated circuit or through other hardware such as a programmable gate array. In another example, the resource module may be implemented as resource module 140-2, which is implemented as computer program code 123 and is executed by the one or more processors 120. For instance, the one or more memories 125 and the computer program code 123 may be configured, with the one or more processors 120, to cause the user equipment 110 to perform one or more of the operations as described herein. The UE 110 communicates with radio access network (RAN) node 170 via a wireless link 111.

The RAN node 170 may be a base station that provides access by wireless devices such as the UE 110 to the wireless network 100. For example, the RAN node 170 may be a node (e.g. a base station) in a NR/5G network such as a gNB (a node that provides NR user plane and control protocol terminations towards the UE 110) or an ng-eNB (a node providing E-UTRA user plane and control plane protocol terminations towards the UE 110, and connected via an NG interface to the core network (i.e. 5G Core (5GC)). The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The RAN node 170 includes a resource module, comprising one of or both parts 150-1 and/or 150-2, which may be implemented in a number of ways. The resource module may be implemented in hardware as resource module 150-1, such as being implemented as part of the one or more processors 152. The resource module 150-1 may be implemented also as an integrated circuit or through other hardware such as a programmable gate array. In another example, the resource module may be implemented as resource module 150-2, which is implemented as computer program code 153 and is executed by the one or more processors 152. For instance, the one or more memories 155 and the computer program code 153 are configured, with the one or more processors 152, to cause the RAN node 170 to perform one or more of the operations as described herein. The one or more network interfaces 161 communicate over a network such as via the links 176 and 131. Two or more RAN nodes 170 communicate using, e.g., link 176. The link 176 may be wired or wireless or both and may implement, e.g., an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the RAN node 170 being physically in a different location from the RRH, and the one or more buses 157 could be implemented in part as fiber optic cable to connect the other elements of the RAN node 170 to the RRH 195.

The wireless network 100 may include a network control element or elements NCE 190 that may include core network functionality, and which provides connectivity via a link or links with a further network, such as a telephone network and/or a data communications network (e.g., the Internet). Such core network functionality for 5G may include access and mobility management function(s) (AMF (s)) and/or user plane functions (UPF(s)) and/or session management function(s) (SMF(s)). Such core network functionality for LTE may include MME (Mobility Management Entity)/SGW (Serving Gateway) functionality. These are merely example functions that may be supported by the NCE 190, and note that both 5G and LTE functions might be supported. The RAN node 170 is coupled via a link 131 to a network control element such as the NCE 190. The link 131 may be implemented as, e.g., an NG interface for 5G, or an Si interface for LTE, or other suitable interface for other standards. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

As similarly stated above, example embodiments of this invention propose at least a scheme to enable contention based preconfigured uplink resource (PUR) for NR-Light devices and fallback mechanisms needed for contention resolution.

Some key inventive steps and additional embodiments in accordance with example embodiments of the invention are provided below.

Figure 1:
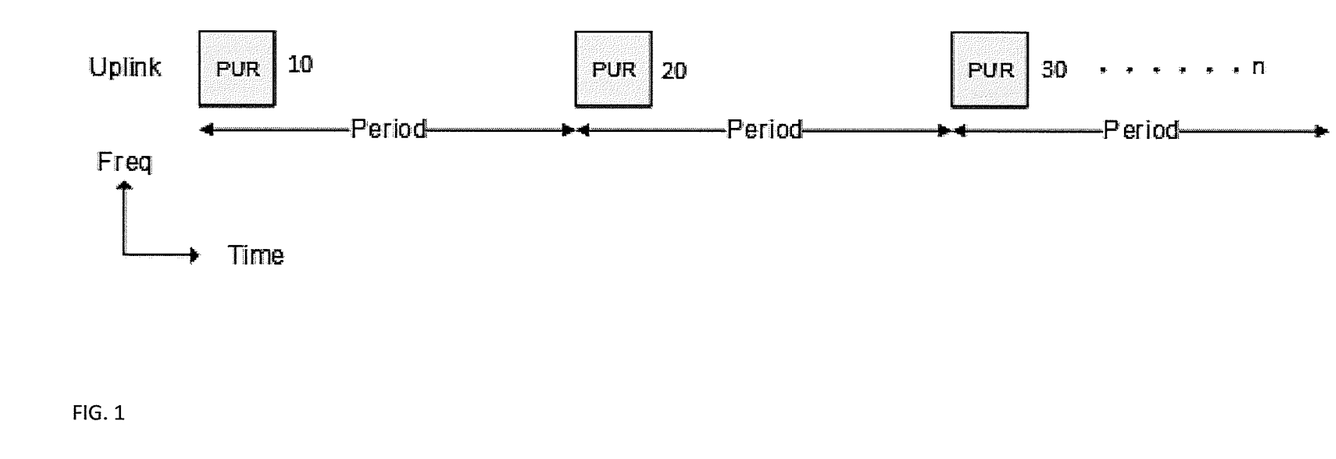
FIG. 1 shows a diagram of preconfigured uplink resources.

FIG. 1 shows one overall scheme in accordance with an example embodiment of the invention.

In FIG. 1 there is shown an operation where there is more than one PUR, e.g., PUR 10, PUR 20, PUR 30 to a PUR n, set up for an uplink over different frequencies and/or time periods.

With regards to the operations as in FIG. 1 there can be embodiments where:

gNB sets up two PUR configurations per UE where the first configuration is contention based shared (CBS) and the second configuration is a dedicated PUR configuration (i.e. contention free):
UE is assigned with UE specific RNTI for monitoring DCI for ACK for each of the PUR,
As part of the CBS PUR configuration, gNB also assigns dedicated PRACH resources if needed, which will be used to indicate to the gNB that it (the UE) did not receive any ACK, and/or
In one embodiment, the different PUR configurations are configured for different BWPs and these may be different BWPs than the BWP the UE is monitoring in idle/inactive mode;
UEs with PUR data to send are able to attempt to use the shared/contention based resources; and
After reception of data on the CBS PUR, gNB uses DCI to send ACK for PUR if decoded correctly. It scrambles the CRC of the encoded DCI using the UE-specific RNTI:
UE uses UE-specific RNTI that was assigned to it to decode DCI properly for receiving ACK of PUR data, and/or
In the case of TDD, if the UE is setup for PUR on different BWPs than the one it is camping on, then the ACK may also serve as a command to the UE to switch back to another BWP. Thus, if the PUR data was received correctly, the UE can switch back to the its monitoring BWP;

In accordance with example embodiments of the invention for a case that a resource, such as a shared or contention based resource, is not able to be utilized as required by a network device such as a user equipment or a base station then in accordance with example embodiments another resource such as a dedicated resource or another bandwidth part can be used as a backup or a fall back for a shared or contention based resource or bandwidth part. The term "fall back" as used herein can refer to these types of operation. This fall back can be used based on an ability to decode the data communication using the resource configuration for the contention based resource, such as where a data communication using the contention based resource is not successfully resolved or decoded by the network node. Further, in accordance with example embodiments this term "fall back" can refer to an alternative operation to fall back from a dedicated resource to a contention based resource or bandwidth part based on an ability to decode signaling using the dedicated resource.

The contention resolution steps in accordance with example embodiments of the invention include the following two options:

Option 1:
The UE which attempted the PUR transmission on CBS resources will attempt to decode the DCI to receive ACK using the dedicated, UE-specific RNTI, and/or
If the UE does not find valid DCI for its RNTI which is meant to receive ACK, the UE may send dedicated preamble assigned to it as part of RRC configuration (Step 1);
On receiving the dedicated preambles from possibly multiple UEs, gNB sends another DCI acknowledging the multiple preambles detected. The common CBS-PUR-RNTI is used for scrambling the CRC for the ACK:
On receiving the second DCI, each UE that transmitted a dedicated preamble retransmits the data it attempted in CBS-PUR via the dedicated PUR immediately following this CBS-PUR, and/or
The DCI may implicitly indicate whether the UE should use D-PUR assigned to specific BWP for this purpose;
If the gNB does not receive any dedicated preamble, the D-PUR reserved as fallback for unicast transmission are released.

Option 2:
The UE which sent data using the CBS PUR will monitor DCI for ACK using its UE specific RNTI,
If the UE does not decode ACK then it uses the D-PUR resources to transmit its data again, and/or
If the gNB ACKs a UE during the CBS PUR step, then the D-PUR resources associated with that UE are released;
As part of dedicated configuration, instead of reserving preambles, the index to NPUSCH-F2 resource which will follow at fixed delay from CBS-PUR can also be assigned in one embodiment. In this case, when there is no ACK received for CBS transmission, the UE sends NPUSCH-F2 instead of preamble transmission.

Figure 2:
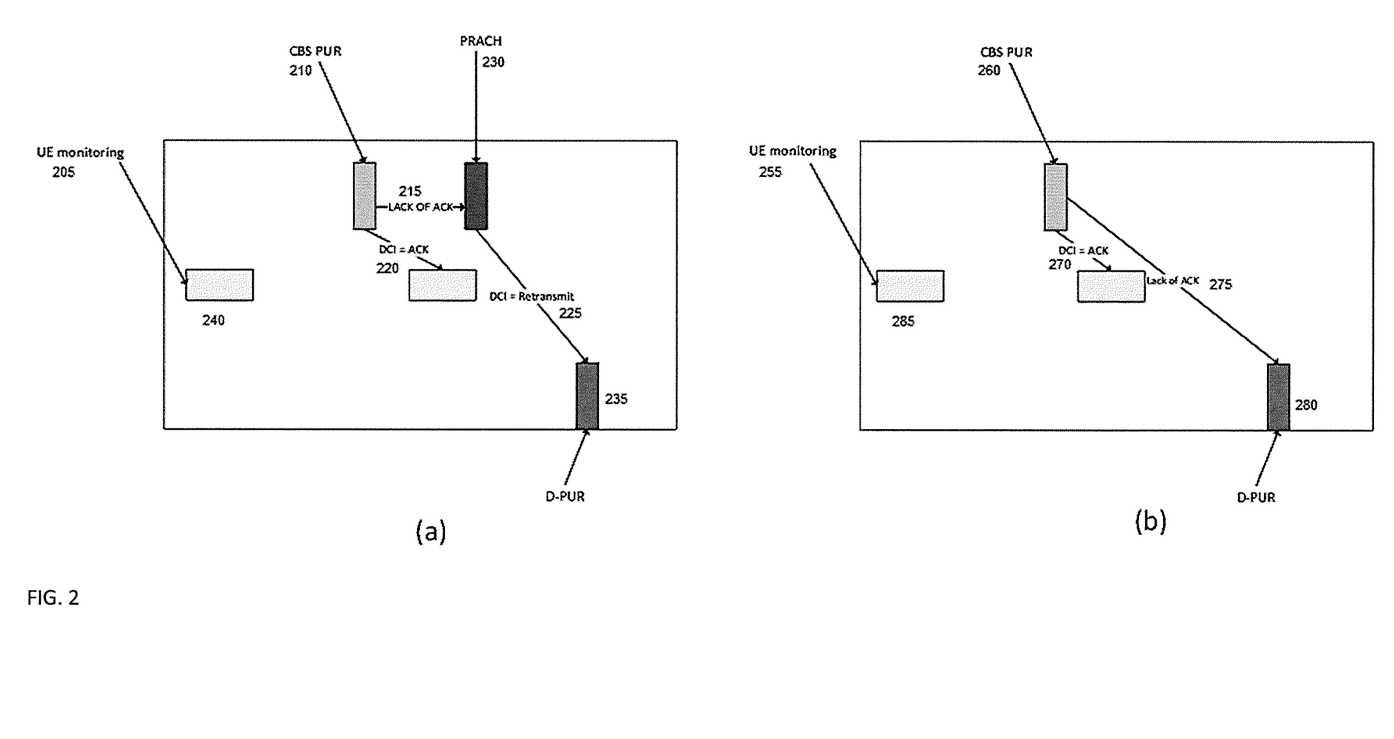
FIG. 2 shows a contention based PUR scheme in accordance with example embodiments of the invention.

FIG. 2 shows contention based PUR schemes in accordance with example embodiments of the invention.

As shown in part (a) of FIG. 2 there is performed UE monitoring 205 of a downlink control channel 240 for DCI scheduling a paging message. Further, as shown in part (a) of FIG. 2 based on a CBS PUR 210 used by the UE for a data communication there is a flow 220 for a case that the DCI indicating ACK is received by the UE, the D-PUR 235 for the UE is released by the gNB and not used by the UE. With a lack of ACK flow 215 for a case that a DCI indicating ACK is not received by the UE, the UE transmits PRACH 230. Following this is a DCI for retransmit flow 225. A DCI acknowledging reception of the PRACH is then signaled by the gNB, which is determined by the UE as an indication to retransmit in the D-PUR for the UE, leading to D-PUR 235 being used by the UE. In addition, the indication to retransmit can also include an implicit indication to switch to a different BWP for the retransmission. Then, as shown part (b) of FIG. 2 there is performed UE monitoring 255 of a downlink control channel 285 for DCI scheduling a paging message. Based on a CBS PUR 260 used by the UE for a data communication there is a flow 270 of FIG. 2 part (b) for a case that a DCI indicating ACK is received by the UE, the D-PUR 235 for the UE is released by the gNB and not used by the UE. With lack of ACK flow 275 for a case of DCI indicating ACK is not received by the UE, the UE determines that it needs to perform a retransmission in the D-PUR 280, leading to D-PUR 280 being used by the UE. In addition, the UE may determine to switch to a different BWP for the retransmission.

One main advantage in accordance with an example embodiment of this invention is to allow PUR resources to be shared among multiple UEs with efficient fallback mechanisms. This allows for more efficient resource allocation while allowing UEs to use the PUR resources when they have data to report. When contention for the CBS PUR occurs the scheme provides the mechanism for the UE to access dedicated PUR resources quickly. This allows the UEs to save power and the network to maximize the resource efficiency. With respect to the two fallback options outlined above option 1 has the advantage of serving delay sensitive reports (e.g., in the case of emergencies or URLLC like data). This option also allows the network to release the D-PUR resources in the case where the UE has no data to send (e.g., bursty traffic). Option 2 has the advantage of not requiring the UE to send PRACH before using the D-PUR resources. Therefore option 2 is more optimal from a UE power consumption point of view.

Figure 3:
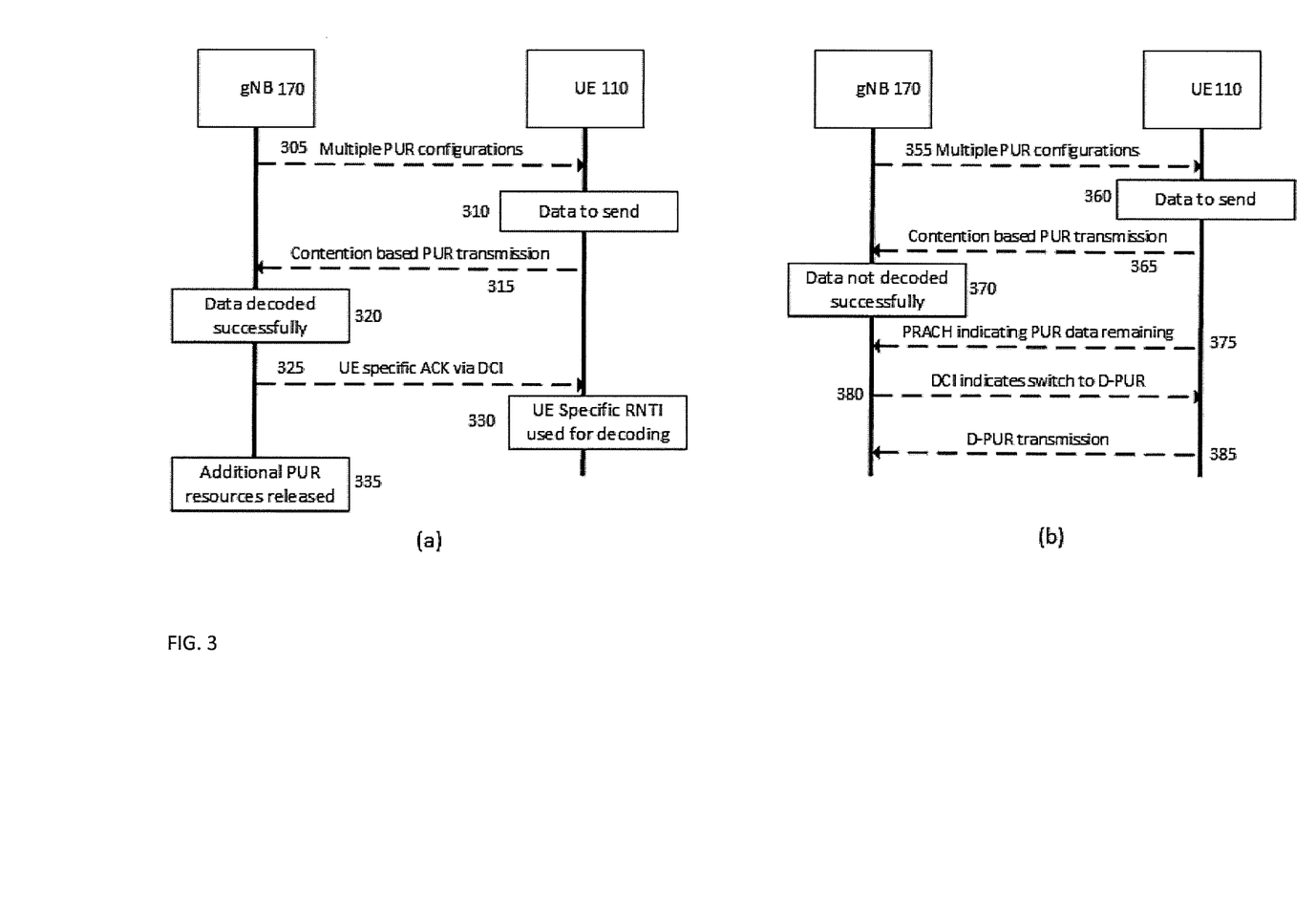
FIG. 3 shows a signalling flow diagram of contention based shared with different PUR schemes in accordance with example embodiments of the invention.

FIG. 3 shows a signalling flow diagram of contention based shared with different PUR schemes in accordance with example embodiments of the invention.

In FIG. 3 there is shown some new operations for Option 1, as described above, in accordance with example embodiments of the invention. These new operations can be seen in at least steps 315, 325, 330, and 335 of part (a) of FIG. 3, and in steps 365, 375, 380, and 385 of part (b) of FIG. 3. In the case of Option 2, as described above, in part (b) of FIG. 3 the steps of sending PRACH and receiving DCI indication to switch to D-PUR may be skipped in accordance with an example embodiment of the invention.

As shown in FIG. 3 in part (a) there is Multiple PUR configurations 305 communicated between the gNB 170 and the UE 110. As shown in step 310 of part (a) of FIG. 3, after receiving the Multiple PUR configurations 305, the UE 110 has Data to send. Then the UE 110 as shown in FIG. 3 sends towards the gNB 170 a Contention based PUR transmission 315. As shown in step 320 of FIG. 3 the gNB 170 determines that the Data is decoded successfully. Then based on this the gNB 170 sends towards the UE 110 a UE specific ACK via DCI 325. At step 330 of FIG. 3 it is shown in step 330 that the UE 110 uses a specific RNTI for decoding. In addition, as shown in FIG. 3 at step 335 the gNB 170 determines that additional PUR resources can be released.

Then as shown in FIG. 3 in part (b) there is Multiple PUR configurations 355 communicated between the gNB 170 and the UE 110. As shown in step 360 of part (b) of FIG. 3, after receiving the Multiple PUR configurations 305 the UE 110 has Data to send. Then the UE 110 as shown in FIG. 3 sends towards the gNB 170 a Contention based PUR transmission 365. As shown in step 370 of FIG. 3 the gNB 170 determines that the Data is not decoded successfully. Then based on this the UE 110 sends towards the gNB 170 a PRACH indicating that PUR data is remaining 375. As shown in step 380 of FIG. 3 the gNB 170 sends towards the UE 110 DCI indicating the UE 110 switch to D-PUR. Then in response, as shown in step 385 of FIG. 3 the UE 110 sends towards the gNB 170 a D-PUR transmission.

Figure 5A:
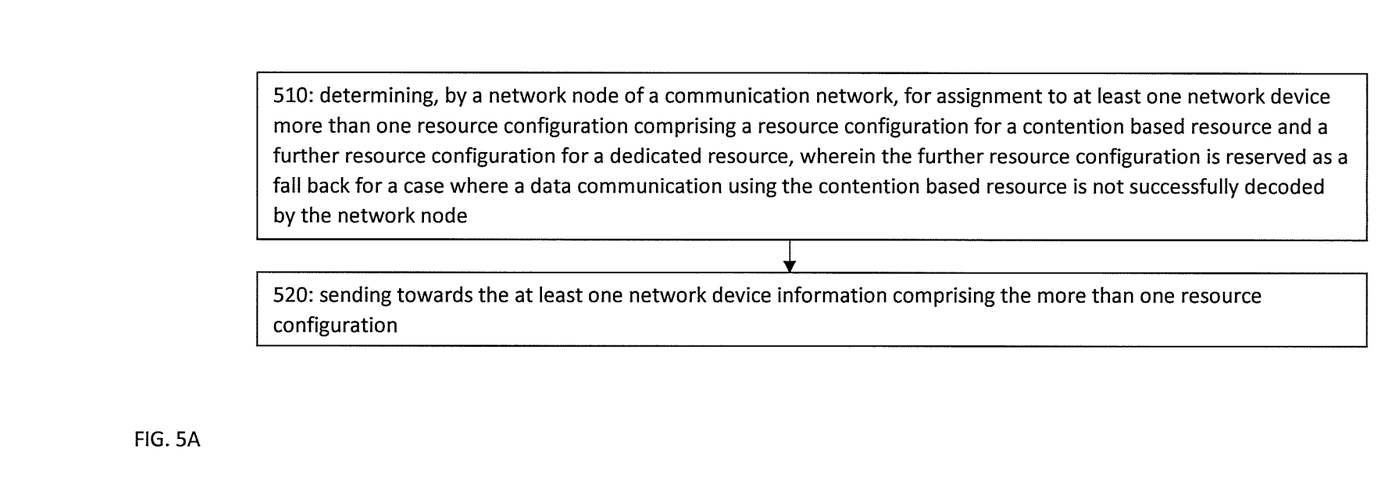
FIG. 5A and FIG. 5B each show a method which may be practiced by an apparatus in accordance with an example embodiment of the invention.

FIG. 5A illustrates operations which may be performed by a device such as, but not limited to, a device associated with the RAN node 170 as in FIG. 4. As shown in step 510 of FIG. 5A there is determining, by a network node of a communication network, for assignment to at least one network device more than one resource configuration comprising a resource configuration for a contention based resource and a further resource configuration for a dedicated resource, wherein the further resource configuration is reserved as a fall back for a case where a data communication using the contention based resource is not successfully decoded by the network node. Then as shown is step 520 of FIG. 5A there is, sending towards the at least one network device information comprising the more than one resource configuration.

In accordance with example embodiments of the invention as described in the paragraph above, there is receiving from the at least one network device a data communication using the resource configuration for the contention based resource of the more than one resource configuration assigned to the at least one network device; determining an ability to decode the data communication using the resource configuration for the contention based resource; and based on the determining, sending towards the at least one network device an indication of the ability to decode the data communication using the resource configuration for the contention based resource.

In accordance with example embodiments of the invention as described in the paragraph above, wherein each of the at least one network device is assigned at least one radio network temporary identifier for monitoring downlink control information associated with the indication.

In accordance with example embodiments of the invention as described in the paragraphs above, wherein the at least one radio network temporary identifier assigned to each of the at least one network device comprises one of: a radio network temporary identifier common to at least one or more network devices of the at least one network device for monitoring the downlink control information, or a radio network temporary identifier specific to one or more network devices of the at least one network device for monitoring the downlink control information.

In accordance with example embodiments of the invention as described in the paragraphs above, wherein based on the indication being an ability to decode, the downlink control information is using the radio network temporary identifier specific to the at least one network device.

In accordance with example embodiments of the invention as described in the paragraphs above, wherein based on the downlink control information using the radio network temporary identifier specific to the at least one network device for monitoring the downlink control information not indicating an acknowledgement of the data communication, the at least one network device is caused to use for the data communication the further resource configuration for the dedicated resource of the more than one resource configuration assigned to the at least one network device.

In accordance with example embodiments of the invention as described in the paragraphs above, there is based on the radio network temporary identifier specific to the at least one network device for monitoring the downlink control information not indicating an acknowledgement of the data communication, the method comprising: receiving from the at least one network device a dedicated preamble assigned to the at least one network device as part of a radio resource control configuration; and based on the receiving, sending other downlink control information acknowledging the dedicated preamble detected.

In accordance with example embodiments of the invention as described in the paragraphs above, wherein the downlink control information is using the radio network temporary identifier common to the at least one network device.

In accordance with example embodiments of the invention as described in the paragraphs above, there is receiving from the at least one network device information applied with the dedicated preamble identifying that preconfigured uplink resource data is remaining to be communicated; and based on the information identifying the preconfigured uplink resource data is remaining, sending towards the at least one network device the other down link control information to cause the at least one network device to use the further resource configuration for the dedicated resource to communicate the preconfigured uplink resource data.

In accordance with example embodiments of the invention as described in the paragraphs above, there is receiving the data communication using the further resource configuration of the more than one resource configuration provided to the at least one network device.

In accordance with example embodiments of the invention as described in the paragraphs above, there is, based on one of: not determining an ability to decode the data communication using the resource configuration for the contention based resource, or not receiving from the at least one network device a dedicated preamble assigned to the at least one network device as part of a radio resource control configuration, releasing dedicated resources of the more than one resource configuration assigned to the at least one network device.

In accordance with example embodiments of the invention as described in the paragraphs above, there is, based on not receiving from the at least one network device a dedicated preamble assigned to the at least one network device as part of a radio resource control configuration, and determining that the data communication using the resource configuration for the contention based resource is not able to be decoded, releasing dedicated resources of the more than one resource configuration assigned to the at least one network device.

A non-transitory computer-readable medium (Memory(ies) 155 as in FIG. 4) storing program code (Computer Program Code 153 as in FIG. 4), the program code executed by at least one processor (Processor(s) 152, Resource Module 150-1, and/or Resource Module 150-2 as in FIG. 4) to perform the operations as at least described in the paragraphs above.

In accordance with an example embodiment of the invention as described above there is an apparatus comprising: means for determining, (e.g., transceivers 160, Memory(ies) 155, Computer Program Code 153, and Processor(s) 152, Resource Module 150-1, and/or Resource Module 150-2 as in FIG. 4), by a network node (e.g., Ran Node 170 as in FIG. 4) of a communication network (wireless network 100 as in FIG. 4), for assignment to at least one network device (e.g., UE 110 as in FIG. 4) more than one resource configuration comprising a resource configuration for a contention based resource and a further resource configuration for a dedicated resource, wherein the further resource configuration is reserved as a fall back for a case where a data communication using the contention based resource is not successfully decoded by the network node; and sending (e.g., transceivers 160, Memory(ies) 155, Computer Program Code 153, and Processor(s) 152, Resource Module 150-1, and/or Resource Module 150-2 as in FIG. 4) towards the at least one network device information comprising the more than one resource configuration.

In the example aspect of the invention according to the paragraph above, wherein at least the means for determining and sending comprises a non-transitory computer readable medium [e.g., Memory(ies) 155 as in FIG. 4] encoded with a computer program [e.g., Computer Program Code 153 as in FIG. 4] executable by at least one processor [e.g., Processor(s) 152, Resource Module 150-1, and/or Resource Module 150-2 as in FIG. 4].

Figure 5B:
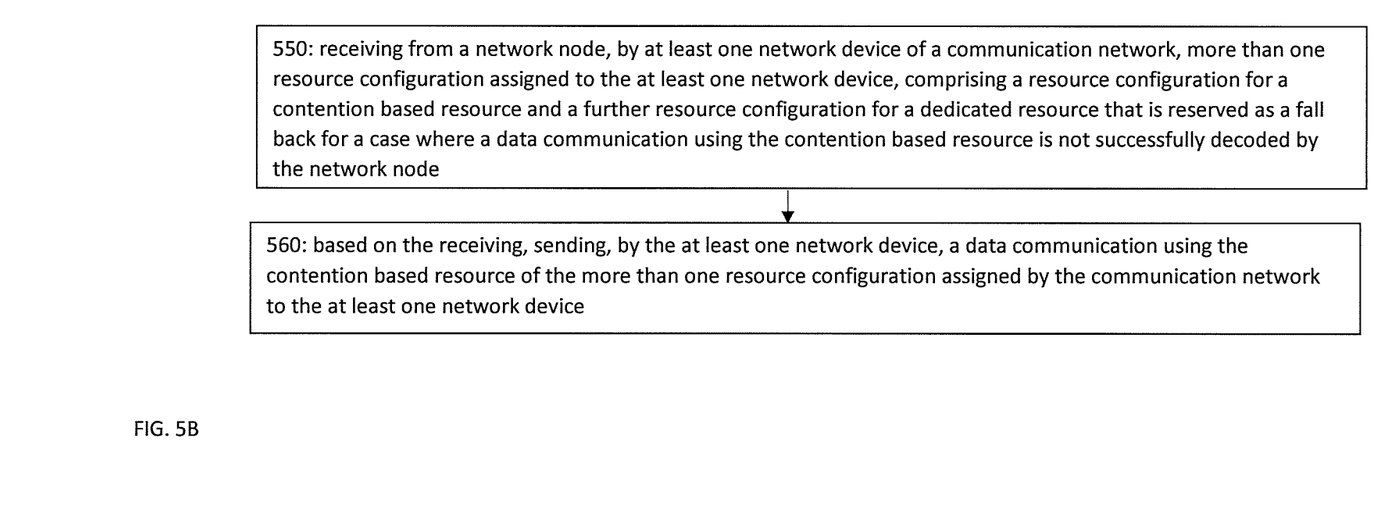

FIG. 5B illustrates operations which may be performed by a device such as, but not limited to, a device associated with the UE 110 as in FIG. 4. As shown in step 550 of FIG. 5B there is receiving from a network node, by at least one network device of a communication network, more than one resource configuration assigned to the at least one network device, comprising a resource configuration for a contention based resource and a further resource configuration for a dedicated resource that is reserved as a fall back for a case where a data communication using the contention based resource is not successfully decoded by the network node. Then as shown in step 560 of FIG. 5B there is, based on the receiving, sending, by at least one network device, a data communication using the contention based resource of the more than one resource configuration assigned by the communication network to the at least one network device.

In accordance with example embodiments of the invention as described in the paragraph above, wherein each of the at least one network device is assigned at least one radio network temporary identifier for monitoring downlink control information associated with the indication.

In accordance with example embodiments of the invention as described in the paragraphs above, wherein the at least one radio network temporary identifier assigned each of the at least one network device comprises one of: a radio network temporary identifier common to at least one or more network devices of the at least one network device for monitoring the downlink control information, or a radio network temporary identifier specific to one or more network devices of the at least one network device for monitoring the downlink control information.

In accordance with example embodiments of the invention as described in the paragraphs above, wherein based on the downlink control information using the radio network temporary identifier specific to one or more network devices of the at least one network device for monitoring the downlink control information not indicating an acknowledgement of the data communication, the at least one network device is caused to use for the data communication the further resource configuration for the dedicated resource of the more than one resource configuration assigned to the at least one network device.

In accordance with example embodiments of the invention as described in the paragraphs above, wherein based on the downlink control information using the radio network temporary identifier specific to one or more network devices of the at least one network device, not indicating an acknowledgement of the data communication.

In accordance with example embodiments of the invention as described in the paragraphs above, there is sending by the at least one network device the dedicated preamble assigned to the at least one network device as part of a radio resource control configuration; and based on the sending, receiving other downlink control information acknowledging the dedicated preamble is detected.

In accordance with example embodiments of the invention as described in the paragraphs above, there is indicating to the network node using the dedicated preamble that the at least one network device has a data communication to send.

In accordance with example embodiments of the invention as described in the paragraphs above, there is sending the data communication using the further resource configuration for the dedicated resource of the more than one resource configuration provided to the more than one network device.

A non-transitory computer-readable medium (Memory(ies) 125 as in FIG. 4) storing program code (Computer Program Code 123 as in FIG. 4), the program code executed by at least one processor (Processor(s) 120, Resource Module 140-1, and/or Resource Module 140-2 as in FIG. 4) to perform the operations as at least described in the paragraphs above.

In accordance with an example embodiment of the invention as described above there is an apparatus comprising: means for receiving (e.g., one or more transceivers 130, Memory(ies) 125, Computer Program Code 123, and Processor(s) 120, Resource Module 140-1, and/or Resource Module 140-2 as in FIG. 4) from a network node (e.g., RAN Node 170 as in FIG. 4), by at least one network device (e.g. UE 110 as in FIG. 4) of a communication network (e.g., wireless network 100 as in FIG. 4), more than one resource configuration assigned to the at least one network device, comprising a resource configuration for a contention based resource and a further resource configuration for a dedicated resource that is reserved as a fall back for a case where a data communication using the contention based resource is not successfully decoded by the network node; and means, based on the receiving, for sending (e.g., one or more transceivers 130, Memory(ies) 125, Computer Program Code 123, and Processor(s) 120, Resource Module 140-1, and/or Resource Module 140-2 as in FIG. 4), by the at least one network device, a data communication using the contention based resource of the more than one resource configuration assigned by the communication network to the at least one network device.

In the example aspect of the invention according to the paragraph above, wherein at least the means for receiving and sending comprises a non-transitory computer readable medium [e.g., Memory(ies) 125 as in FIG. 4] encoded with a computer program [e.g., Computer Program Code 123 as in FIG. 4] executable by at least one processor [e.g., Processor(s) 120, Resource Module 140-1, and/or Resource Module 140-2 as in FIG. 4].

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" as may be used herein can be intended to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method, comprising:
   determining, by a network node of a communication network, for assignment to at least one network device more than one resource configuration comprising a resource configuration for a contention based resource and a further resource configuration for a dedicated resource, wherein the further resource configuration is reserved as a fall back for a case where a data communication using the contention based resource is not successfully decoded by the network node;
   sending towards the at least one network device information comprising the more than one resource configuration;
   receiving from the at least one network device a data communication using the resource configuration for the contention based resource;
   determining an ability to decode the data communication using the resource configuration for the contention based resource; and
   based on the determining, sending towards the at least one network device an indication of the ability to decode the data communication using the resource configuration for the contention based resource, wherein each of the at least one network device is assigned at least one radio network temporary identifier for monitoring downlink control information associated with the indication.

2. The method of claim 1, wherein the at least one radio network temporary identifier assigned to each of the at least one network device comprises one of:
   a radio network temporary identifier common to at least one or more network devices of the at least one network device for monitoring the downlink control information, or
   a radio network temporary identifier specific to one or more network devices of the at least one network device for monitoring the downlink control information.

3. The method of claim 2, comprising:
   based on the radio network temporary identifier specific to the at least one network device not indicating an acknowledgement of the data communication, the method comprising:
   receiving from the at least one network device a dedicated preamble assigned to the at least one network device as part of a radio resource control configuration; and
   based on the receiving, sending other downlink control information acknowledging the dedicated preamble detected.

4. The method of claim 3, comprising:
receiving from the at least one network device information applied with the dedicated preamble identifying that preconfigured uplink resource data is remaining to be communicated; and
based on the information, sending towards the at least one network device the other down link control information to cause the at least one network device to use the further resource configuration for the dedicated resource to communicate the preconfigured uplink resource data.

5. An apparatus, comprising:
at least one processor; and
at least one memory including computer program code, where the at least one memory and the computer program code are configured, with the at least one processor, to cause the apparatus to at least:
determine, by a network node of a communication network, for assignment to at least one network device more than one resource configuration comprising a resource configuration for a contention based resource and a further resource configuration for a dedicated resource, wherein the further resource configuration is reserved as a fall back for a case where a data communication using the contention based resource is not successfully decoded by the network node;
send towards the at least one network device information comprising the more than one resource configuration;
receive from the at least one network device a data communication using the resource configuration for the contention based resource;
determine an ability to decode the data communication using the resource configuration for the contention based resource;
based on the determining, send towards the at least one network device an indication of the ability to decode the data communication using the resource configuration for the contention based resource;
receive from the at least one network device a dedicated preamble assigned to the at least one network device as part of a radio resource control configuration;
based on the receiving, send other downlink control information acknowledging the dedicated preamble detected, wherein each of the at least one network device is assigned at least one radio network temporary identifier for monitoring downlink control information associated with the indication, wherein the at least one radio network temporary identifier assigned to each of the at least one network device comprises one of:
a radio network temporary identifier common to at least one or more network devices of the at least one network device for monitoring the downlink control information, or
a radio network temporary identifier specific to one or more network devices of the at least one network device for monitoring the downlink control information.

6. The apparatus of claim 5, wherein the at least one memory including the computer program code is configured with the at least one processor to cause the apparatus to:
receive from the at least one network device information applied with the dedicated preamble identifying that preconfigured uplink resource data is remaining to be communicated; and
based on the information identifying the preconfigured uplink resource data is remaining, send towards the at least one network device the other down link control information to cause the at least one network device to use the further resource configuration for the dedicated resource to communicate the preconfigured uplink resource data.

7. An apparatus, comprising:
at least one processor; and
at least one memory including computer program code, where the at least one memory and the computer program code are configured, with the at least one processor, to cause the apparatus to at least:
receive from a network node, by at least one network device of a communication network, more than one resource configuration assigned to the at least one network device, comprising a resource configuration for a contention based resource and a further resource configuration for a dedicated resource that is reserved as a fall back for a case where a data communication using the contention based resource is not successfully decoded by the network node; and
based on the receiving, send, by the at least one network device, a data communication using the contention based resource of the more than one resource configuration assigned by the communication network to the at least one network device, wherein each of the at least one network device is assigned at least one radio network temporary identifier for monitoring downlink control information associated with an indication of the ability to decode a data communication using the resource configuration for the contention based resource, wherein the at least one radio network temporary identifier assigned to each of the at least one network device comprises one of:
a radio network temporary identifier common to at least one or more network devices of the at least one network device for monitoring the downlink control information, or
a radio network temporary identifier specific to one or more network devices of the at least one network device for monitoring the downlink control information, wherein based on downlink control information using the radio network temporary identifier specific to one or more network devices of the at least one network device for monitoring the downlink control information not indicating an acknowledgement of the data communication,
wherein the at least one network device is caused to use for the data communication the further resource configuration for the dedicated resource of the more than one resource configuration assigned to the at least one network device.

8. The apparatus of claim 7, wherein based on downlink control information using the radio network temporary identifier specific to one or more network devices of the at least one network device not indicating an acknowledgement of the data communication, the at least one memory including the computer program code is configured with the at least one processor to cause the apparatus to:
receive, by the at least one network device, an indication of a dedicated preamble assigned to the at least one network device.

9. The apparatus of claim 8, wherein the at least one memory including the computer program code is configured with the at least one processor to cause the apparatus to:
send by the at least one network device the dedicated preamble assigned to the at least one network device as part of a radio resource control configuration; and based on the sending, receive other downlink control information acknowledging the dedicated preamble is detected.

10. The apparatus of claim 9, wherein the at least one memory including the computer program code is configured with the at least one processor to cause the apparatus to:
   indicate to the network node using the dedicated preamble that the at least one network device has a data communication to send.

11. The apparatus of claim 9, wherein the at least one memory including the computer program code is configured with the at least one processor to cause the apparatus to:
   send the data communication using the further resource configuration for the dedicated resource of the more than one resource configuration provided to the more than one network device.

* * * * *